US012149181B2

(12) United States Patent
Wang et al.

(10) Patent No.: US 12,149,181 B2
(45) Date of Patent: Nov. 19, 2024

(54) GENERATOR SYSTEM BASED ON HIGH-FREQUENCY ISOLATED MATRIX CONVERTER AND REGULATION METHOD THEREOF

(71) Applicant: SOUTHEAST UNIVERSITY, Jiangsu (CN)

(72) Inventors: Zheng Wang, Jiangsu (CN); Yang Xu, Jiangsu (CN); Yinzhen Shen, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/267,784

(22) PCT Filed: Oct. 14, 2022

(86) PCT No.: PCT/CN2022/125233
§ 371 (c)(1),
(2) Date: Jun. 16, 2023

(87) PCT Pub. No.: WO2024/065885
PCT Pub. Date: Apr. 4, 2024

(65) Prior Publication Data
US 2024/0356457 A1    Oct. 24, 2024

(30) Foreign Application Priority Data
Sep. 28, 2022    (CN) .......................... 202211192811.7

(51) Int. Cl.
*H02M 7/219*    (2006.01)
*H02P 9/02*    (2006.01)

(52) U.S. Cl.
CPC .............. *H02M 7/219* (2013.01); *H02P 9/02* (2013.01)

(58) Field of Classification Search
CPC ................................. H02M 7/219; H02P 9/02
See application file for complete search history.

(56) References Cited

U.S. PATENT DOCUMENTS

| 6,879,062 B2 * | 4/2005 | Oates | H02M 5/225 |
| | | | 307/106 |
| 8,558,405 B2 * | 10/2013 | Brogan | H02J 3/381 |
| | | | 290/55 |

(Continued)

FOREIGN PATENT DOCUMENTS

| CN | 105305855 | 2/2016 |
| CN | 110829868 | 2/2020 |

(Continued)

OTHER PUBLICATIONS

"International Search Report (Form PCT/ISA/210) of PCT/CN2022/125233", mailed on Dec. 26, 2022, pp. 1-4.

(Continued)

*Primary Examiner* — Pedro J Cuevas
(74) *Attorney, Agent, or Firm* — JCIPRNET

(57) ABSTRACT

A generator system includes a permanent magnet synchronous generator, a high-frequency matrix converter, a center-tapped high-frequency transformer and a full-bridge converter. An output port of the permanent magnet synchronous generator is connected to a three-phase input of the high-frequency matrix converter. Positive and negative output poles of the high-frequency matrix converter are connected to a primary side of the center-tapped high-frequency transformer, The primary side of the high-frequency transformer is connected to a center tap and then connected to the middle pole of the center-tapped high-frequency matrix converter, and the secondary side of the center-tapped high-frequency transformer is connected to the midpoint of the bridge arms of the full-bridge converter. A midpoint of the input bridge arm of the full-bridge converter is connected to the second- (Continued)

ary side of the center-tapped high-frequency transformer, and an output side of the full-bridge converter is connected with a DC load.

8 Claims, 9 Drawing Sheets

(56) References Cited

U.S. PATENT DOCUMENTS

| | | | | |
|---|---|---|---|---|
| 9,013,902 B2* | 4/2015 | Abe | ............ | H02J 3/00 |
| | | | | 363/69 |
| 11,251,618 B2* | 2/2022 | Harrison | ............ | H02J 3/1835 |
| 11,271,487 B2* | 3/2022 | Bruce | ............ | H02J 1/00 |
| 11,491,883 B2* | 11/2022 | Khaligh | ............ | H02M 7/797 |
| 11,641,110 B2* | 5/2023 | Harrison | ............ | H02J 3/1835 |
| | | | | 307/77 |
| 2002/0176265 A1* | 11/2002 | Oates | ............ | H02M 5/225 |
| | | | | 363/35 |
| 2012/0173035 A1* | 7/2012 | Abe | ............ | H02J 3/00 |
| | | | | 700/297 |
| 2012/0299305 A1* | 11/2012 | Brogan | ............ | H02J 3/1807 |
| | | | | 290/55 |
| 2014/0117917 A1* | 5/2014 | Takeda | ............ | H02M 5/16 |
| | | | | 318/519 |
| 2014/0160824 A1* | 6/2014 | Inomata | ............ | H02M 5/297 |
| | | | | 363/150 |
| 2014/0176100 A1* | 6/2014 | Hara | ............ | H02M 5/293 |
| | | | | 323/282 |
| 2021/0155100 A1* | 5/2021 | Khaligh | ............ | B60L 55/00 |
| 2021/0175815 A1* | 6/2021 | Bruce | ............ | H02J 1/00 |

FOREIGN PATENT DOCUMENTS

| | | |
|---|---|---|
| CN | 114400909 | 4/2022 |
| CN | 114865983 | 8/2022 |
| JP | 2013106468 | 5/2013 |

OTHER PUBLICATIONS

"Written Opinion of the International Searching Authority (Form PCT/ISA/237) of PCT/CN2022/125233", mailed on Dec. 26, 2022, pp. 1-5.

* cited by examiner

GENERATOR SYSTEM BASED ON HIGH-FREQUENCY ISOLATED MATRIX CONVERTER AND REGULATION METHOD THEREOF

CROSS-REFERENCE TO RELATED APPLICATION

This application is a 371 of international application of PCT application serial no. PCT/CN2022/125233, filed on Oct. 14, 2022, which claims the priority benefit of China application no. 202211192811.7, filed on Sep. 28, 2022. The entirety of each of the above-mentioned patent applications is hereby incorporated by reference herein and made a part of this specification.

TECHNICAL FIELD

The present invention relates to the technical field of power generation, power transformation or power distribution, and particularly relates to a generator system based on a high-frequency isolated matrix converter and a regulation method thereof.

DESCRIPTION OF RELATED ART

High-frequency isolated converters are classified into two categories, one is a two-stage isolated converter, where the front stage is a rectifier, and the rear stage is an isolated DC-DC converter, such as a resonant converter and a phase-shift full-bridge converter. An electrolytic capacitor needs to be added between the two stages to achieve energy decoupling on both sides. However, the electrolytic capacitor limits the working environment and the service life of the converter, which is not conducive to further optimization of the converter. The other category of isolated converter is a single-stage high-frequency matrix converter, which does not require an intermediate energy storage DC link, but can improve the system efficiency and prolong the service life of the system.

However, the existing high-frequency isolated matrix converters require the use of bidirectional power devices, which causes the following problems. First, due to characteristics of semiconductor power devices, metal-oxide-semiconductor field-effect transistors (MOSFETs) and insulated gate bipolar transistors (IGBTs) are both provided with anti-parallel diodes, and no commercial bidirectional power devices are available on the market currently; second, the bidirectional power devices need to be connected by the common source or common drain of two existing switches, thereby increasing the on-state resistance of the system and reducing the efficiency of the converter; and third, the bidirectional power devices hide a risk of commutation failure due to a large number of power switches thereof and complicated commutation mode, which is not conducive to the safe and stable operation of the system.

SUMMARY

I. Technical Problem to be Solved

Aiming at deficiencies of the prior art, the present invention provides a generator system based on a high-frequency isolated matrix converter and a regulation method thereof, which uses the most common devices for voltage-source converter on the market, so that the cost and reliability of the devices are guaranteed; it is unnecessary to connect existing devices through a common drain or a common source, so that the additional on-resistance caused by series connection of devices is reduced; and it does not require the complicated multi-step commutation method, but adopts a simplified commutation strategy which can save the spending on additional controllers, reduce the probability of commutation failure and enhance the reliability of the system.

II. Technical Solution

In order to achieve the above objectives, the present invention is implemented through the following solution.

In one aspect, the present invention provides a generator system based on a high-frequency isolated matrix converter, where the system includes a permanent magnet synchronous generator, a high-frequency matrix converter, a center-tapped high-frequency transformer and a full-bridge converter.

The output port of the permanent magnet synchronous generator is connected to the three-phase input port of high-frequency matrix converter.

The three-phase input port of the high-frequency matrix converter is connected to the permanent magnetic synchronous generator, the positive and negative poles of the output port of the high-frequency matrix converter are connected to the primary side of the center-tapped high-frequency transformer, and the middle pole of the high-frequency matrix converter is connected to the center tap of the primary side of the center-tapped high-frequency transformer.

The primary side of the high-frequency transformer is connected to a center tap and then connected to the middle pole of the high-frequency matrix converter, and the secondary side of the center-tapped high-frequency transformer is connected to the midpoint of the bridge arms of the full-bridge converter.

The midpoint of the input bridge arms of the full-bridge converter is connected to the secondary side of the center-tapped high-frequency transformer, and the output side of the full-bridge converter is connected to a DC load.

The sequence of voltage vectors of the high-frequency matrix converter is determined according to the phase current amplitude of the motor.

Preferably, the high-frequency matrix converter includes a first power switch, a second positive power switch, a second negative power switch, a third power switch, a fourth positive power switch, a fourth negative power switch, a fifth power switch, a sixth positive power switch and a sixth negative power switch.

A common drain of the fourth positive power switch and the fourth negative power switch is connected to form a first bridge arm, the midpoint of which is connected to the source electrode of the first power switch and an a-phase port of the motor, respectively.

A common drain of the sixth positive power switch and the sixth negative power switch is connected to form a second bridge arm, the midpoint of which is connected to the source electrode of the third power switch and a b-phase port of the motor, respectively.

A common drain of the second positive power switch and the second negative power switch is connected to form a third bridge arm, the midpoint of which is connected to the source electrode of the fifth power switch and a c-phase port of the motor, respectively.

A common drain of the first power switch, the third power switch and the fifth power switch is connected to form a first connection point, which is the output midpoint of the high-frequency matrix converter and is connected to the center tap of the center-tapped high-frequency transformer.

A common source of the fourth positive power switch, the sixth positive power switch and the second positive power switch is connected to form a second connection point, which is connected to the source electrode of positive power switches, and the drain output of the positive power switches is connected to the non-corresponding terminal of the primary side of the center-tapped high-frequency transformer.

A common source of the fourth negative power switch, the sixth negative power switch and the second negative power switch is connected to form a third connection point, which is connected to the source electrode of negative power switches, and the drain output of the negative power switches is connected to the corresponding terminal of the primary side of the center-tapped high-frequency transformer.

Preferably, the full-bridge converter includes a seventh power switch, an eighth power switch, a ninth power switch and a tenth power switch.

The seventh power switch and the eighth power switch are connected in series to form a fourth bridge arm, and the ninth power switch and the tenth power switch are connected in series to form a fifth bridge arm.

Preferably, the action time of voltage vectors of the high-frequency matrix converter is corrected according to the commutation time of the leakage inductance current of the center-tapped high-frequency transformer, and the action time of three voltage vectors of the high-frequency matrix converter after correction is:

$$\begin{cases} T_1 = T_s m_a \sin\left(\frac{\pi}{3} - \theta_i\right) \\ T_2 = T_s m_a \sin(\theta_i) + 2T_{d2} \\ T_0 = (T_s - T_1 - T_2) \end{cases}$$

wherein $T_1$, $T_2$ and $T_0$ are the sums of the dwell time of the first active vector $V_1$, the second active vector $V_2$, zero vectors $V_7$ and $V_8$, respectively; $m_a$ and $\theta_i$ are the modulation index and angle of the voltage reference, respectively, and $T_s$ is the switching period.

Preferably, the commutation time of the leakage inductance current of the center-tapped high-frequency transformer is $T_{d2} = |i_b| L_{kp} n_s / u_{dc} n_p$, where $u_{dc}$ is the DC load voltage of the full-bridge converter, $L_{kp}$ is the leakage inductance of the center-tapped high-frequency transformer, $n_p / n_s$ is the turn ratio of the center-tapped high-frequency transformer, and $i_b$ is the b-phase winding current of the motor.

Preferably, the high-frequency matrix converter is suitable for other isolated AC-DC conversion applications with AC power supply.

Preferably, the high-frequency matrix converter adopts a field-oriented control scheme, and realizes high-efficiency operation of the system through dual-closed-loop control of D-axis and Q-axis currents.

In another aspect, the present invention provides a regulation method for the generator system based on a high-frequency isolated matrix converter, which includes the following steps.

four voltage vectors acting on the high-frequency matrix converter in a positive half cycle are the first zero vector of the positive half cycle $V_8$, the first active vector of the positive half cycle $V_1$, the second active vector of the positive half cycle $V_2$ and the second zero vector of the positive half cycle $V_7$; the corresponding input currents of the high frequency matrix transformer are 0, I1, I2 and 0, respectively; after comparing inductance currents of the motor, it is determined that the action sequence of voltage vectors is $V_8$, $V_1$, $V_2$ and $V_7$, when $I_2 > I_1 > 0$, and $I_1$ and $I_2$ are the a-phase current and the negative c-phase current $i_a$ and $-i_c$, respectively.

At the action stage of the second zero vector of the negative half cycle, the second zero vector of the negative half cycle $V_8$ acted on the high-frequency matrix converter during the previous switching cycle, but after one switching cycle begins, the second negative power switch, the fourth negative power switch and the sixth negative power switch of the high-frequency matrix converter are turned on, and the negative power switches have an "ON" signal; besides, the eighth power switch and the ninth power switch of the full-bridge converter have an "ON" signal.

At the action stage of the first zero vector of the positive half cycle, the first zero vector of the positive half cycle $V_8$ firstly acts on the high-frequency matrix converter after one switching cycle starts, the second negative power switch, the fourth negative power switch and the sixth negative power switch are turned off with zero current, and the second positive power switch, the fourth positive power switch and the sixth positive power switch are turned on with zero voltage; the state of the full-bridge converter remains unchanged, and the converter does not transmit energy at the moment.

At the commutation stage of the leakage inductance current, the first active vector of the positive half cycle $V_1$ is ready to act after the action time of the first active vector of the positive half cycle $V_8$ is over: first, the leakage inductance current of the transformer is increased to prevent voltage spikes caused by unequal phase currents with inductance; then, the positive power switches are turned on, the negative voltage is loaded on the leakage inductance of the transformer, which increases the current of the leakage inductance until that equals to the current corresponding to the first active vector of the next positive half cycle; at the moment, body diodes of the first power switch, the third power switch and the fifth power switch are freewheeling, and the eighth power switch and the ninth power switch of the full-bridge converter are turned on.

At the action stage of the first active vector of the positive half cycle, the first zero vector of the positive half cycle $V_1$ begins to act on the high-frequency matrix converter after the commutation stage of the leakage inductance current is over, the first power switch is turned on with zero voltage, the driving signals of the eighth power switch and the ninth power switch of the full-bridge converter are removed, the current of the transformer is commutated to the anti-parallel diodes of the seventh power switch and the tenth power switch, the seventh power switch and the tenth power switch are turned on with zero voltage, and the energy is transmitted to the DC load from the motor side at the moment.

At the action stage of the second active vector of the positive half cycle, the second active vector of the positive half cycle $V_2$ starts to act after the action time of the first active vector of the positive half cycle $V_1$ is over, the leakage inductance current the transformer is naturally commutated, and the energy is transmitted from to the DC load from the motor side at the moment.

After the action time of the second active vector of the positive half cycle $V_2$ is over, the second zero vector of the positive half cycle starts to act, the second positive power switch is then turned off, the fifth power switch is turned on, and the winding current of the motor are freewheeling in the first power switch, the third power switch and the fifth power switch; the positive power switches of the high-frequency matrix converter, the seventh power switch and tenth power switch of the full-bridge converter are turned off without current path; and the converter does not transmit any energy at the moment.

III. Beneficial Effects

The present invention provides a generator system based on a high-frequency isolated matrix converter and a regulation method thereof, which uses the most common power switches for voltage-source converters on the market, thus ensuring the cost and reliability of the devices; it is unnecessary to connect existing devices through a common drain or a common source, so that the additional on-resistance caused by series connection of devices is reduced; and there is no need for complicated multi-step commutation method, but a simplified commutation strategy instead can save spending on additional controllers, reduce the probability of commutation failure and enhance the reliability of the system.

DESCRIPTION OF THE EMBODIMENTS

The technical solution of the present invention will be clearly and completely described below with reference to the accompanying drawings in the embodiments of the present invention. Apparently, the embodiments described are merely some rather than all of the embodiments of the present invention. All the other embodiments obtained by those of ordinary skill in the art based on the embodiments in the present invention without creative efforts shall fall within the protection scope of the present invention.

Figure 1:
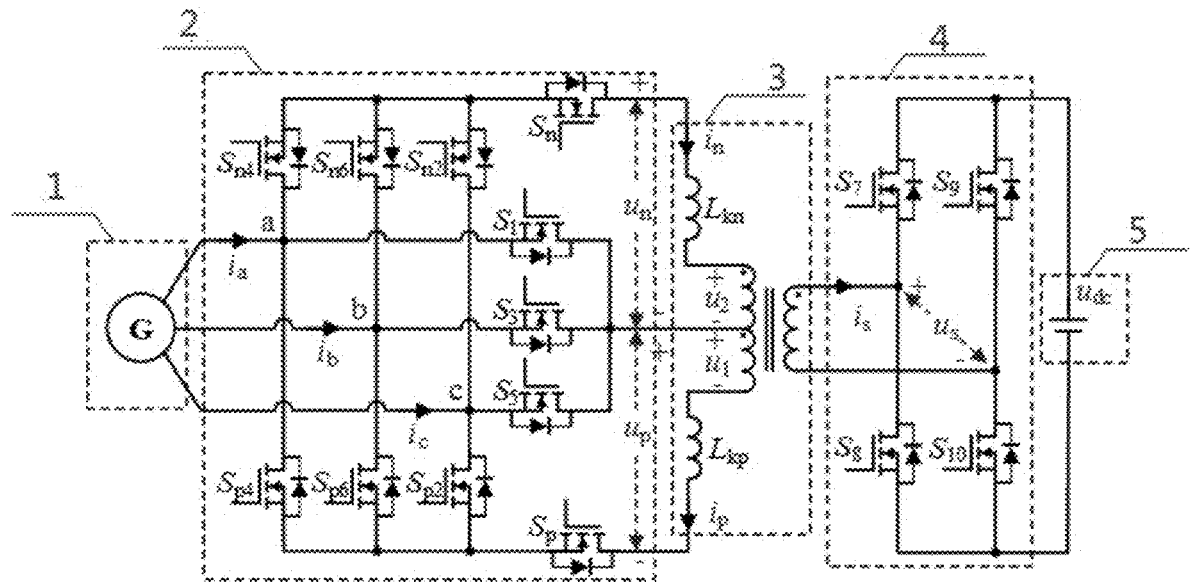
FIG. 1 is a main circuit topology diagram of a high-frequency matrix converter.
Figure 2:
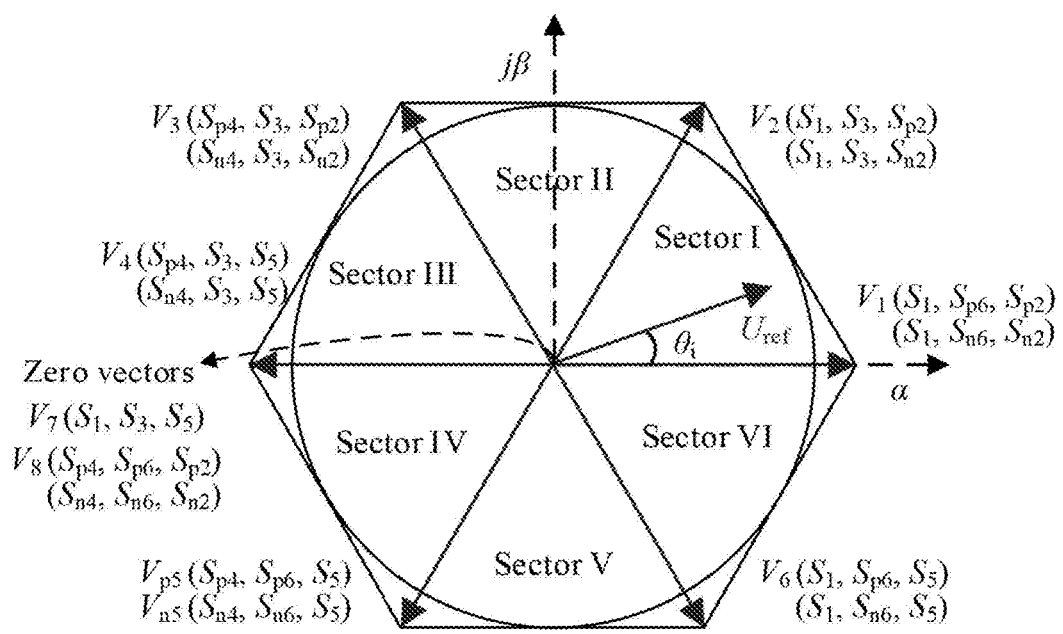
FIG. 2 is a voltage space vector diagram of a high-frequency matrix converter.

As shown in FIG. 1, an embodiment of the present invention, in one aspect, provides a generator system based on a high-frequency isolated matrix converter, and the system includes a permanent magnet synchronous generator, a high-frequency matrix converter, a center-tapped high-frequency transformer and a full-bridge converter.

The output port of the permanent magnet synchronous generator is connected to a rear-stage high-frequency matrix converter.

The three-phase input of the high-frequency matrix converter is connected to the permanent magnet synchronous generator, positive and negative poles of an output of the high-frequency matrix converter are connected to the primary side of the center-tapped high-frequency transformer, and the middle pole of the high-frequency matrix converter is connected to the center tap of a primary side of the center-tapped high-frequency transformer blocks of the block diagrams.

The primary side of the high-frequency transformer is connected to a center tap and then connected to the middle pole of the high-frequency matrix converter, and the secondary side of the center-tapped high-frequency transformer is connected to the midpoint of the bridge arms of the full-bridge converter.

The midpoint of the input bridge arm of the full-bridge converter is connected to the secondary side of the center-tapped high-frequency transformer, and an output side of the full-bridge converter is connected with a DC load.

An action sequence of voltage vectors of the high-frequency matrix converter is determined according to the line current amplitude of the motor.

Preferably, the high-frequency matrix converter includes a first power switch, a second positive power switch, a second negative power switch, a third power switch, a fourth positive power switch, a fourth negative power switch, a fifth power switch, a sixth positive power switch and a sixth negative power switch.

A common drain of the fourth positive power switch and the fourth negative power switch is connected to form a first bridge arm, the midpoint of which is connected to the source electrode of the first power switch and an a-phase port of the motor, respectively.

A common drain of the sixth positive power switch and the sixth negative power switch is connected to form a second bridge arm, the midpoint of which is connected to the source electrode of the third power switch and a b-phase port of the motor, respectively.

A common drain of the second positive power switch and the second negative power switch is connected to form a third bridge arm, the midpoint of which is connected to the source electrode of the fifth power switch and a c-phase port of the motor, respectively.

A common drain of the first power switch, the third power switch and the fifth power switch is connected to form a first connection point, which is the output midpoint of the high-frequency matrix converter and is connected to the center tap of the center-tapped high-frequency transformer.

A common source of the fourth positive power switch, the sixth positive power switch and the second positive power switch is connected to form a second connection point, which is connected to the source electrode of positive power switches, and the drain output of the positive power switches is connected to the non-corresponding terminal of the primary side of the center-tapped high-frequency transformer.

A common source of the fourth negative power switch, the sixth negative power switch and the second negative power switch is connected to form a third connection point, which is connected to the source electrode of negative power switches, and the drain output of the negative power switches is connected to the corresponding terminal of the primary side of the center-tapped high-frequency transformer.

Preferably, the full-bridge converter includes a seventh power switch, an eighth power switch, a ninth power switch and a tenth power switch.

The seventh power switch and the eighth power switch are connected in series to form a fourth bridge arm, and the ninth power switch and the tenth power switch are connected in series to form a fifth bridge arm.

Preferably, the action time of voltage vectors of the high-frequency matrix converter is corrected according to the commutation time of the leakage inductance current of the center-tapped high-frequency transformer, and the action time of three voltage vectors of the high-frequency matrix converter after correction is:

$$\begin{cases} T_1 = T_s m_a \sin\left(\frac{\pi}{3} - \theta_i\right) \\ T_2 = T_s m_a \sin(\theta_i) + 2T_{d2} \\ T_0 = (T_s - T_1 - T_2) \end{cases}$$

wherein $T_1$, $T_2$ and $T_0$ are the sums of the time of action of the first active vector $V_1$, the second active vector $V_2$, zero vectors $V_7$ and $V_8$, respectively; $m_a$ and $\theta_i$ are the modulation ratio and angle of the space vector modulation, respectively, and $T_s$ is one switching cycle.

Preferably, the commutation time of the leakage inductance current of the center-tapped high-frequency transformer is $T_{d2}=|i_b|L_{kp}n_s/u_{dc}n_p$, where $u_{dc}$ is the DC load voltage of the full-bridge converter, $L_{kp}$ is the leakage inductance of the center-tapped high-frequency transformer, $n_p/n_s$ is the turn ratio of the center-tapped high-frequency transformer, and $i_b$ is the b-phase winding current of the motor.

Preferably, the high-frequency matrix converter is suitable for other isolated AC-DC conversion applications with AC power supply.

Figure 5:
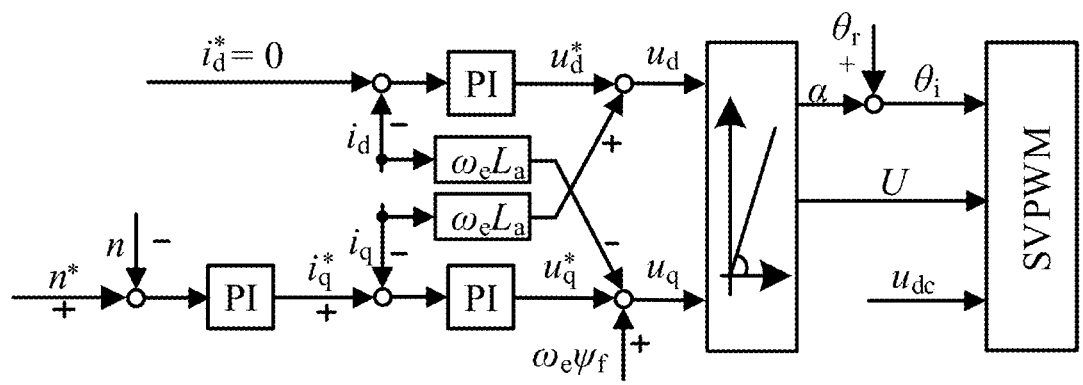
FIG. 5 is a waveform diagram of steady-state voltage and current of a high-frequency matrix converter.

Preferably, referring to FIG. 5, the high-frequency matrix converter adopts a field-oriented control scheme, and realizes high-efficiency operation of the system through dual-closed-loop control of D-axis and Q-axis currents.

In another aspect, the present invention provides a regulation method for a generator system based on a high-frequency isolated matrix converter, which includes the following steps.

Figure 3:
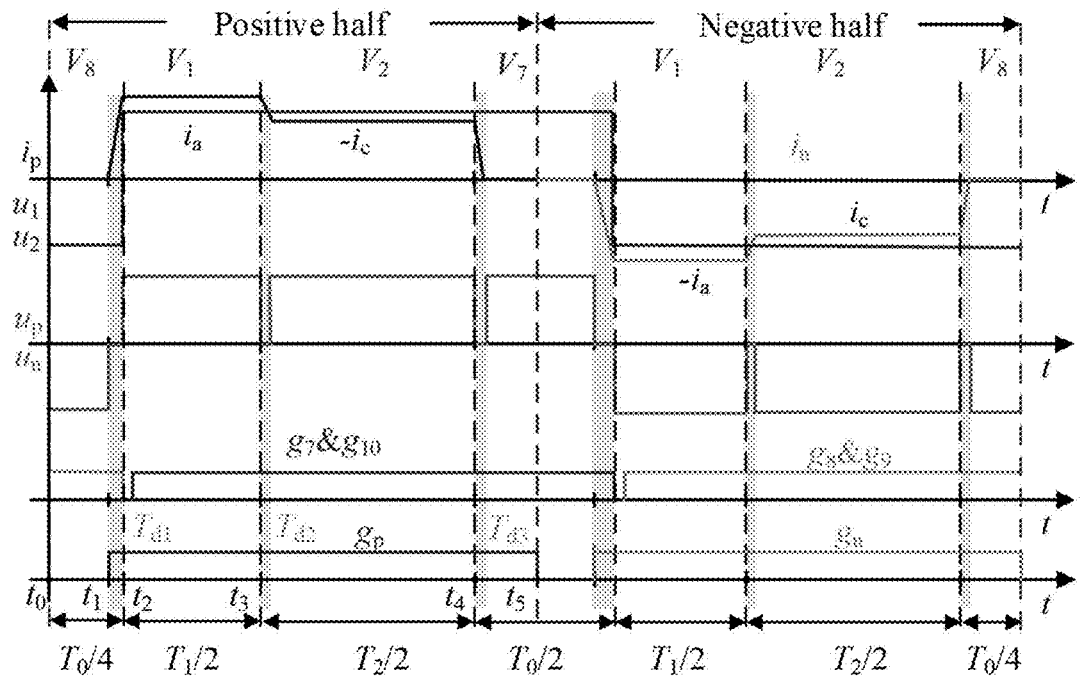
FIG. 3 is a key waveform diagram during one switching cycle.
Figure 4A:
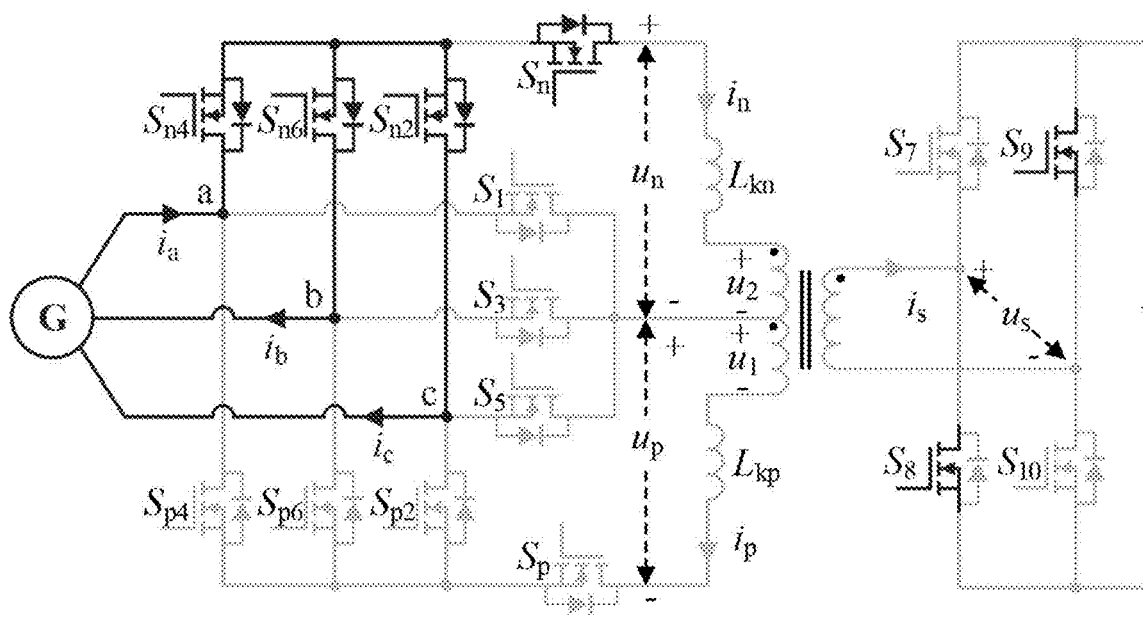
FIG. 4a is a current flow path diagram of a converter at the action stage of the second zero vector of the negative half cycle in the first half switching cycle.
Figure 4B:
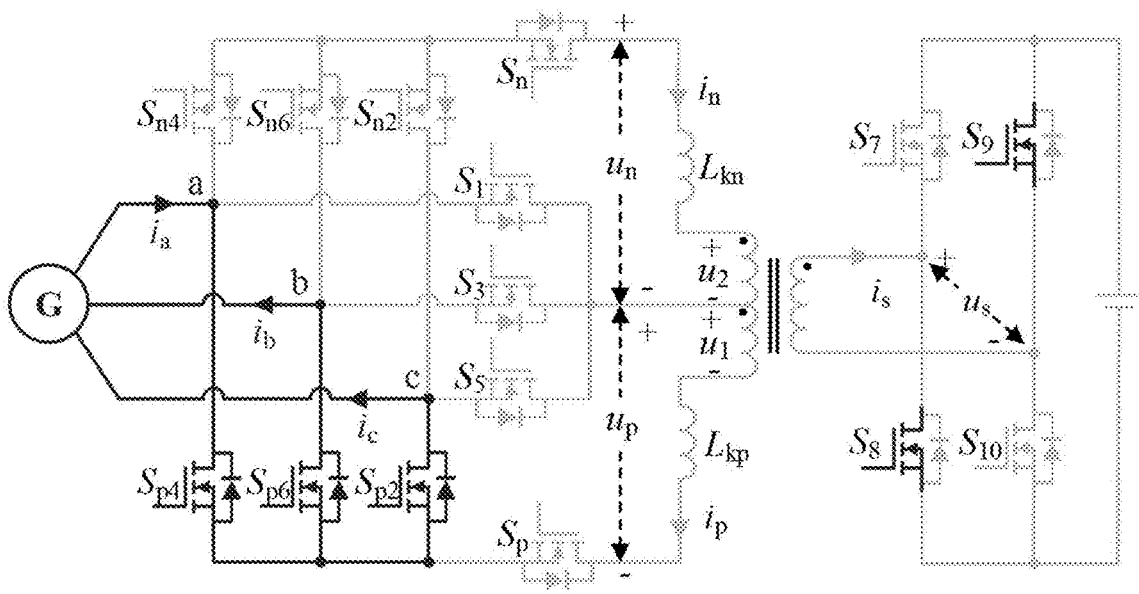
FIG. 4b is a current flow path diagram of a converter at the action stage of the first zero vector of the positive half cycle in the first half switching cycle.
Figure 4C:
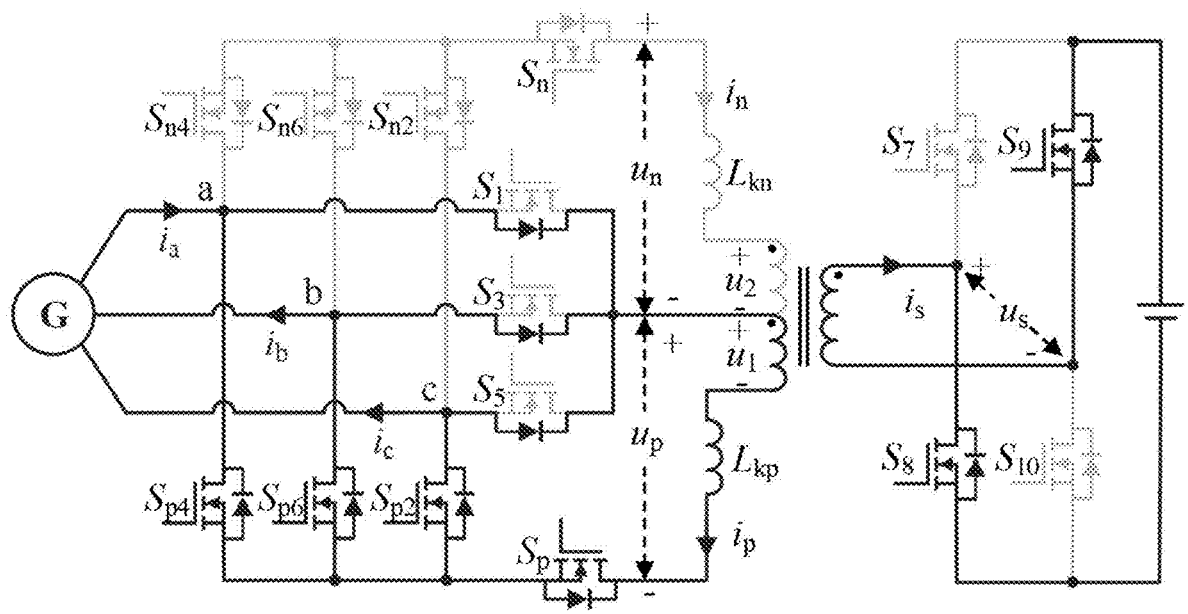
FIG. 4c is a current flow path diagram of a converter at the stage commutation of the leakage inductance current in the first half switching cycle.
Figure 4D:
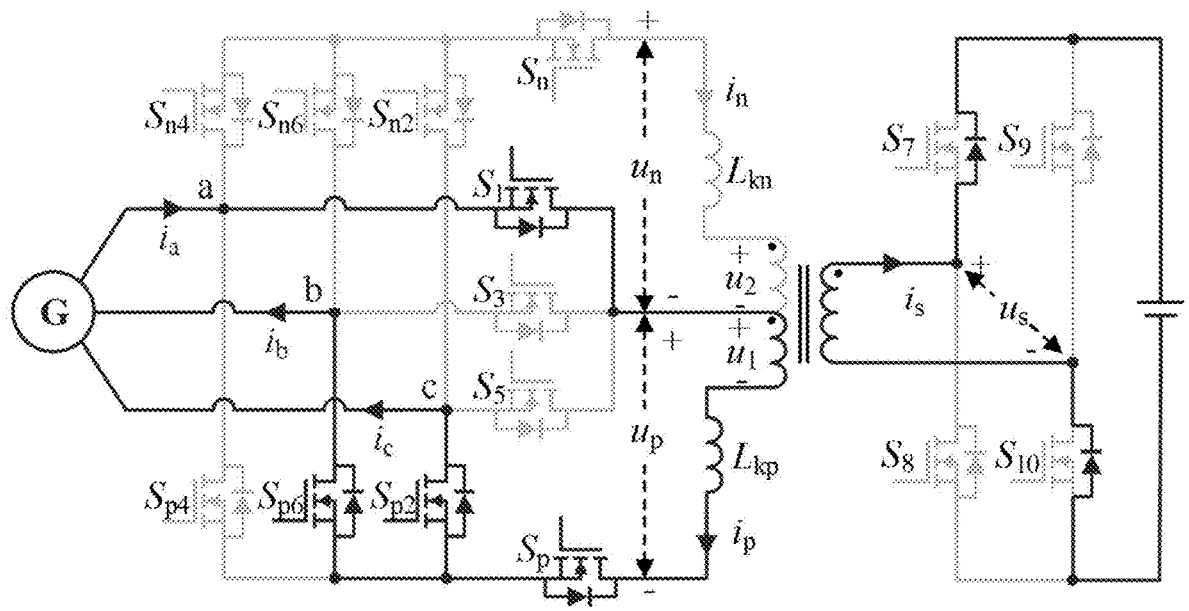
FIG. 4d is a current flow path diagram of a converter at the action stage of the first active vector of the positive half cycle in the first half switching cycle.
Figure 4E:
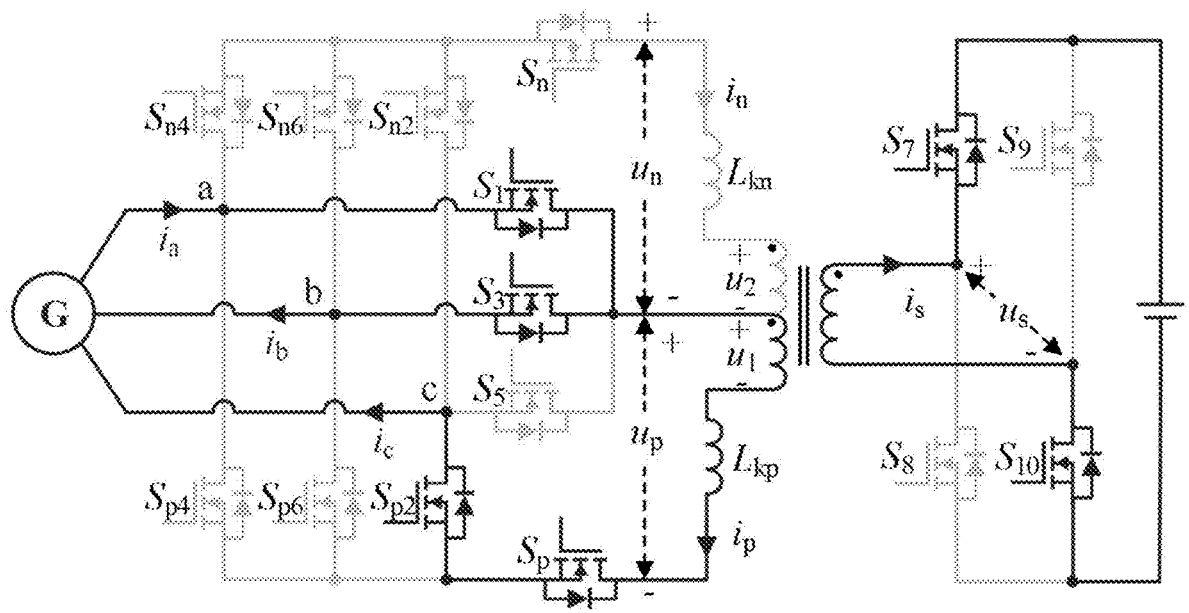
FIG. 4e is a current flow path diagram of a converter at the action stage of the second active vector of the positive half cycle in the first half switching cycle.
Figure 4F:
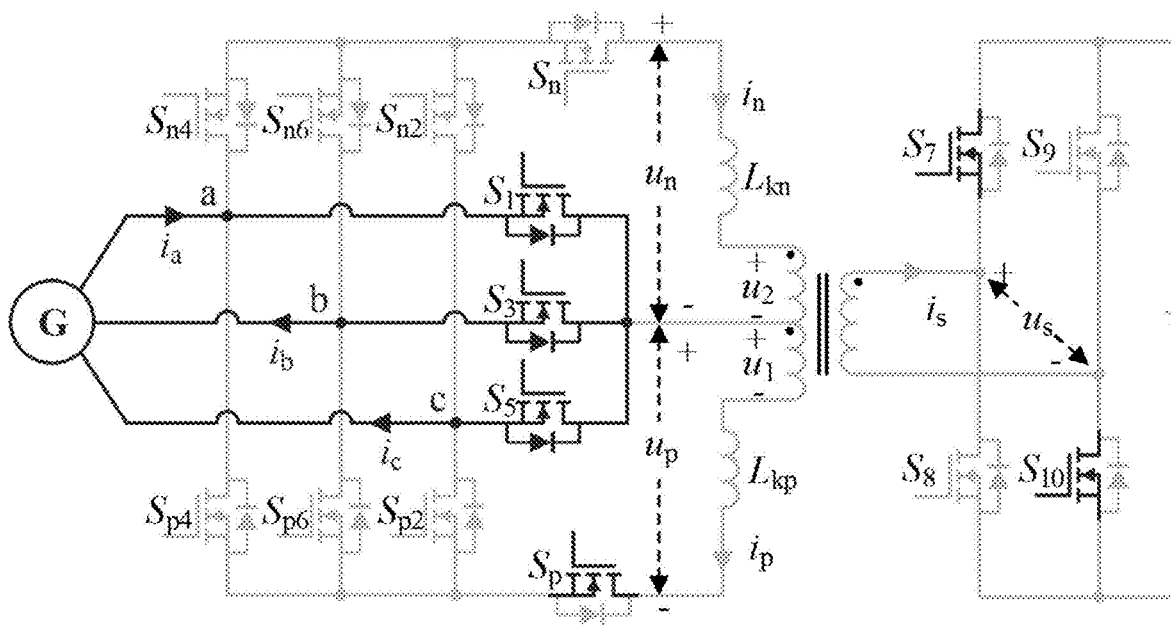
FIG. 4f is a current flow path diagram of a converter at the action stage of the second zero vector of the positive half cycle in the first half switching cycle.

Referring to FIG. 3, four voltage vectors acting on the high-frequency matrix converter in a positive half cycle of a power switch are the first zero vector of the positive half cycle $V_8$, the first active vector of the positive half cycle $V_1$, the second active vector of the positive half cycle $V_2$ and the second zero vector of the positive half cycle $V_7$; the corresponding input currents of the high frequency matrix transformer are 0, I1, I2 and 0, respectively; after comparing inductance currents of the motor, it is determined that the action sequence of voltage vectors is $V_8$, $V_1$, $V_2$ and $V_7$, when $I_2>I_1>0$, and $I_1$ and $I_2$ are the a-phase current and the negative c-phase current $i_a$ and $-i_c$, respectively.

Specifically, referring to FIGS. 3 and 4, at the action stage of the second zero vector of the negative half cycle, the second zero vector of the negative half cycle $V_8$ acted on the high-frequency matrix converter during the previous switching cycle, but after one switching cycle begins, the second negative power switch, the fourth negative power switch and the sixth negative power switch of the high-frequency matrix converter are turned on, and the negative power switches have an "ON" signal; besides, the eighth power switch and the ninth power switch of the full-bridge converter have an "ON" signal.

At the action stage of the first zero vector of the positive half cycle, the first zero vector of the positive half cycle $V_8$ firstly acts on the high-frequency matrix converter after one switching cycle starts, the second negative power switch, the fourth negative power switch and the sixth negative power switch are turned off with zero current, and the second positive power switch, the fourth positive power switch and the sixth positive power switch are turned on with zero voltage; the state of the full-bridge converter remains unchanged, and the converter does not transmit energy at the moment.

At the commutation stage of the leakage inductance current, the first active vector of the positive half cycle $V_1$ is ready to act after the action time of the first active vector of the positive half cycle $V_8$ is over: first, the leakage inductance current of the transformer is increased to prevent voltage spikes caused by unequal phase currents with inductance; then, the positive power switches are turned on, the negative voltage is loaded on the leakage inductance of the transformer, which increases the current of the leakage inductance until that equals to the current corresponding to the first active vector of the next positive half cycle; at the moment, body diodes of the first power switch, the third power switch and the fifth power switch are freewheeling, and the eighth power switch and the ninth power switch of the full-bridge converter are turned on.

At the action stage of the first active vector of the positive half cycle, the first zero vector of the positive half cycle $V_1$ begins to act on the high-frequency matrix converter after the commutation stage of the leakage inductance current is over, the first power switch is turned on with zero voltage, the driving signals of the eighth power switch and the ninth power switch of the full-bridge converter are removed, the current of the transformer is commutated to the anti-parallel diodes of the seventh power switch and the tenth power switch, the seventh power switch and the tenth power switch are turned on with zero voltage, and the energy is transmitted to the DC load from the motor side at the moment.

At the action stage of the second active vector of the positive half cycle, the second active vector of the positive half cycle $V_2$ starts to act after the action time of the first active vector of the positive half cycle $V_1$ is over, the leakage inductance current the transformer is naturally commutated, and the energy is transmitted from to the DC load from the motor side at the moment.

After the action time of the second active vector of the positive half cycle $V_2$ is over, the second zero vector of the positive half cycle starts to act, the second positive power switch is then turned off, the fifth power switch is turned on, and the winding current of the motor are freewheeling in the first power switch, the third power switch and the fifth power switch; the positive power switches of the high-frequency matrix converter, the seventh power switch and tenth power switch of the full-bridge converter are turned off without current path; and the converter does not transmit any energy at the moment.

Figure 6:
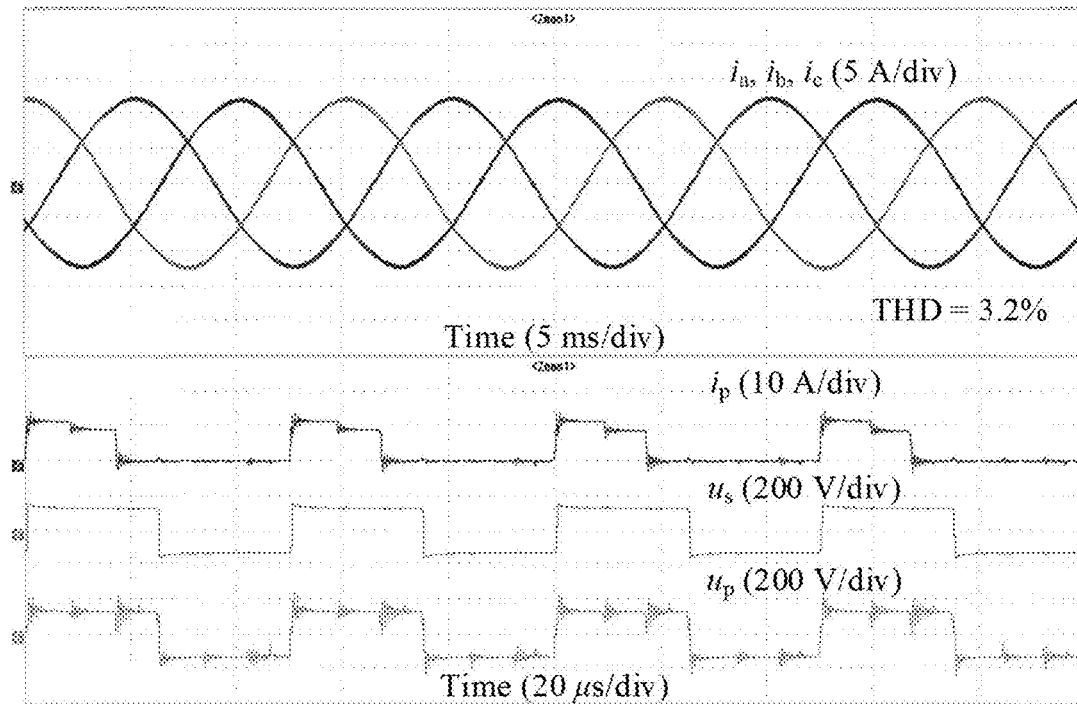
FIG. 6 is a voltage and current diagram in the high-frequency transformer of an embodiment.

As shown in FIG. 6, the generator system based on the high-frequency isolated matrix converter without four-quadrant power devices can operate safely and stably in wind power generation occasions, with low current distortion rate and no obvious overcharge of voltage and current in the high-frequency transformer.

FIG. 7 show primary currents of the transformer $i_p$ and $i_n$, and the secondary current of the transformer $i_s$, under different rotational speeds of the generator. It can be found that the sum of two winding currents of the primary side of the center-tapped high-frequency transformer equals to the output current, that is $$i_p + i_n = i_s$$

Figure 7A:
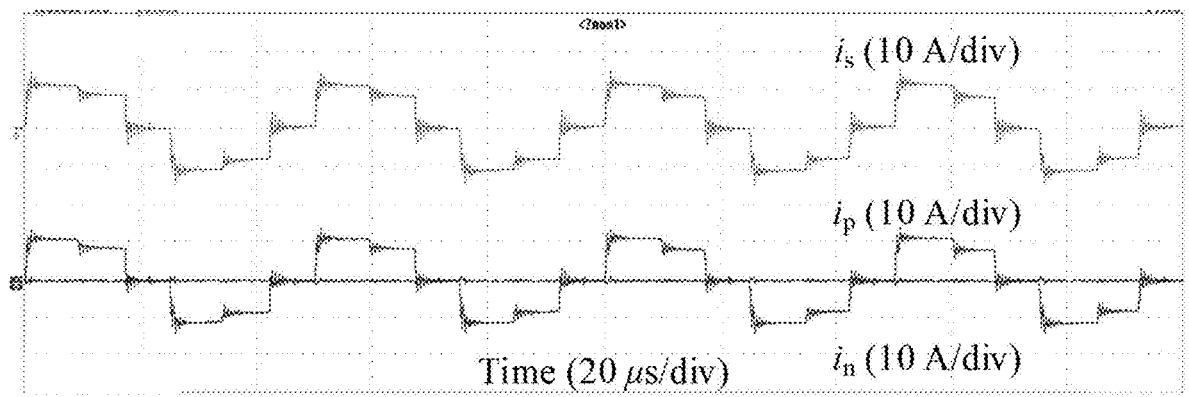
FIG. 7a is a waveform diagram of input and output currents of the high-frequency transformer at a rotational speed of 1,000 rpm.
Figure 7B:
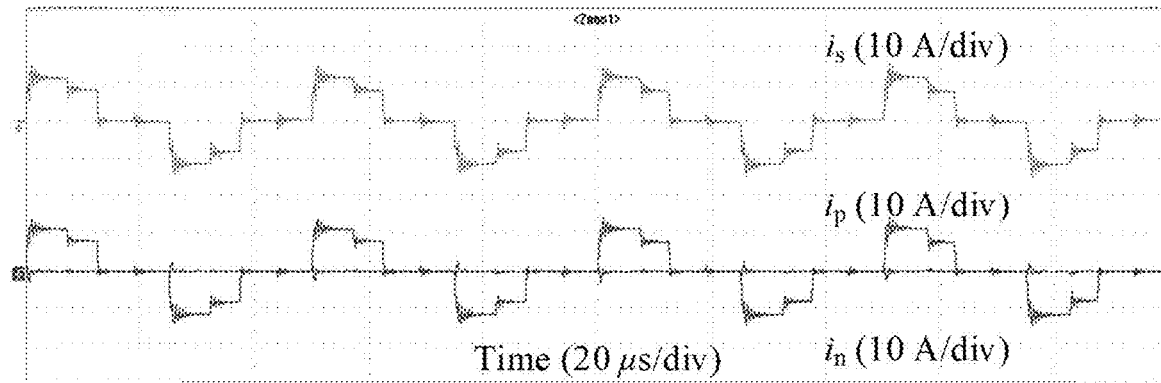
FIG. 7b is a waveform diagram of input and output currents of the high-frequency transformer at a rotational speed of 750 rpm.
Figure 7C:
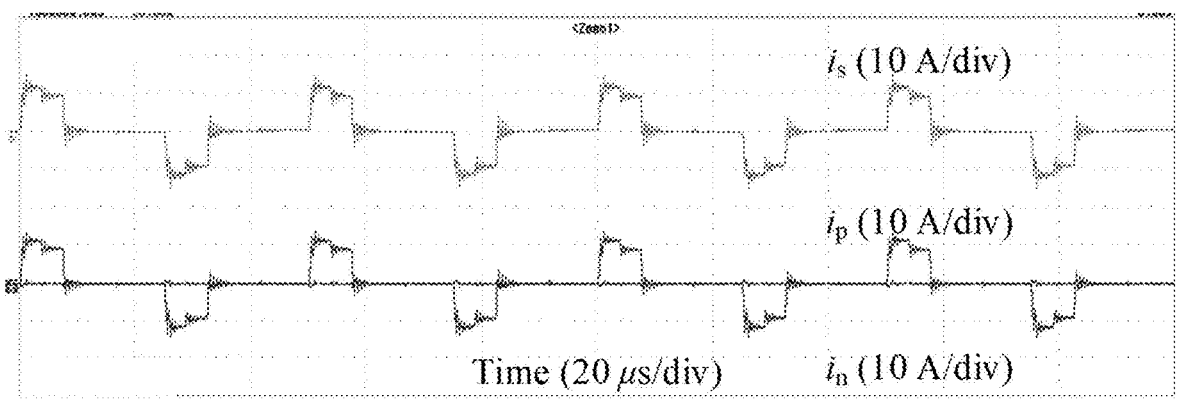
FIG. 7c is a waveform diagram of input and output currents of the high-frequency transformer at a rotational speed of 500 rpm.

Under different rotational speeds, namely, 1,000 rpm in FIG. 7a, 750 rpm in FIG. 7b and 500 rpm in FIG. 7c, the current amplitude of the transformer remains unchanged, but the duty cycle changes, indicating that the generator system based on the high-frequency isolated matrix converter without four-quadrant power devices is suitable for the occasions with great changes in input and output voltages.

Figure 8:
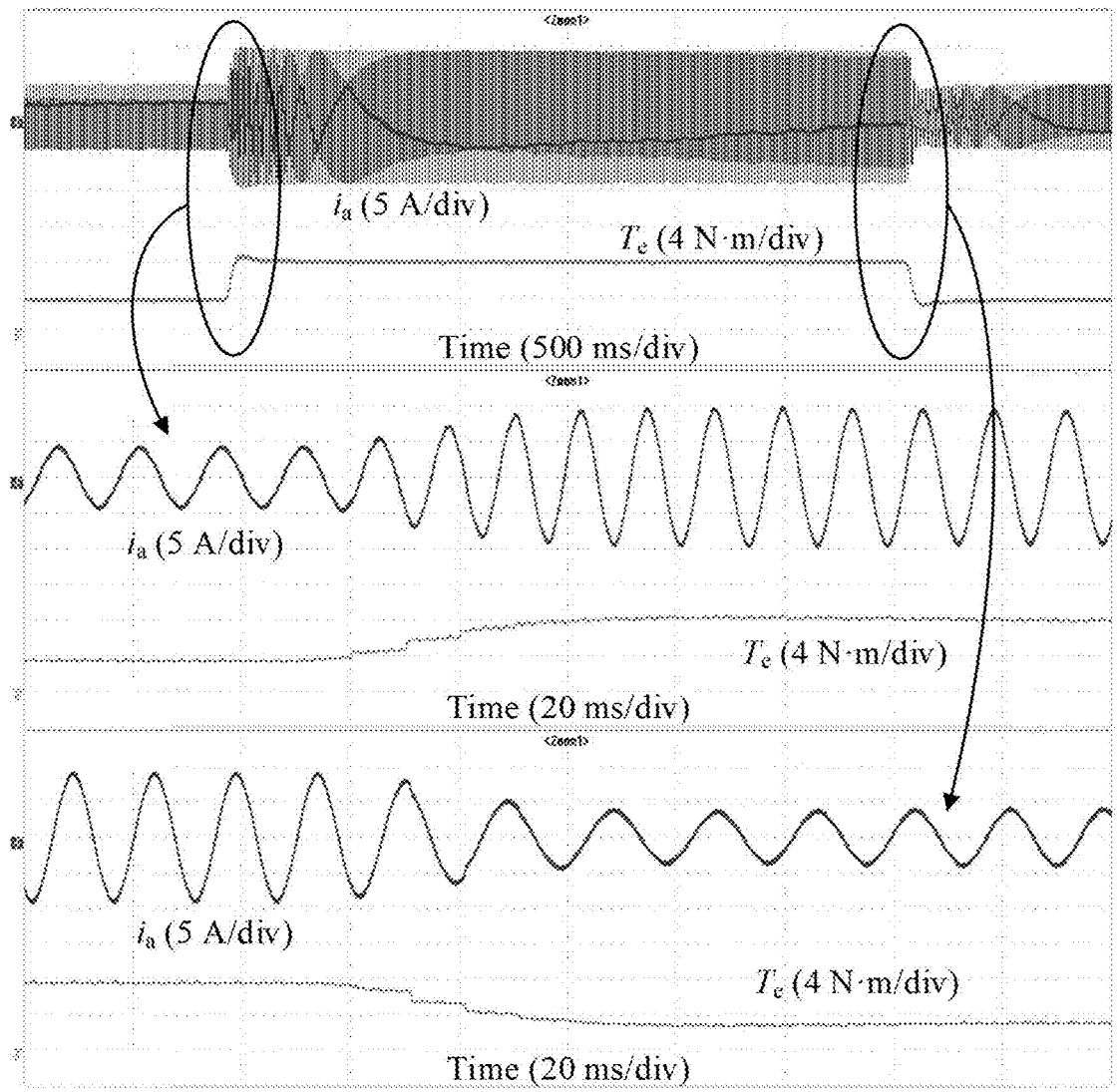
FIG. 8 is dynamic response of the current and electromagnetic torque of a motor under sudden changes in the torque of a wind turbine generator.
Figure 9:
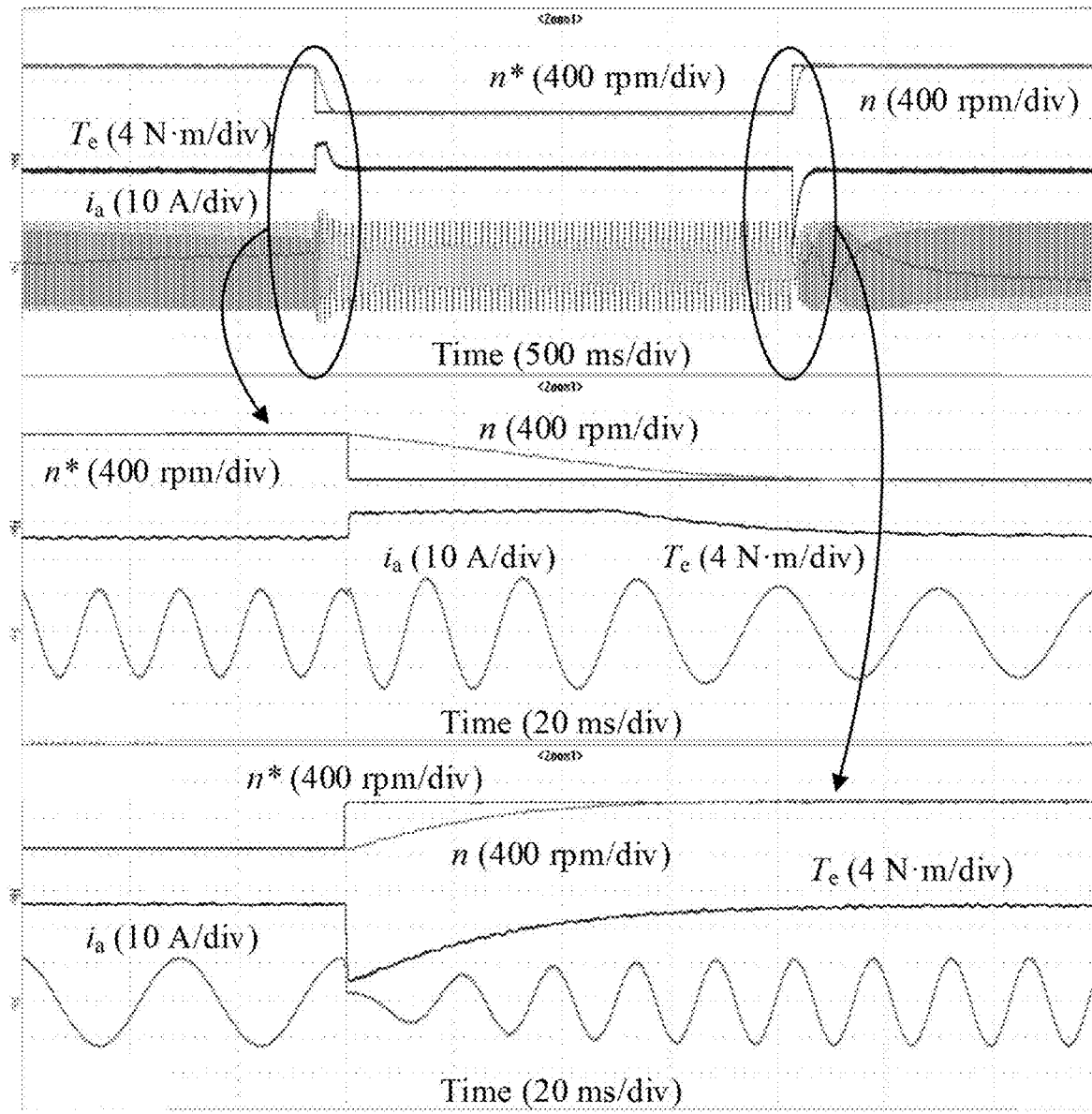
FIG. 9 is dynamic response of the current and electromagnetic torque of a motor under sudden changes in the rotational speed of a wind turbine generator.

FIG. 8 shows the current and electromagnetic torque response of the motor when the torque of the prime mover changes suddenly. FIG. 9 shows the response characteristic of the motor when the reference rotational speed of the motor suddenly drops from 1,000 rpm to 500 rpm and then returns to 1,000 rpm. It can be found that the generator system based on the high-frequency isolated matrix converter without four-quadrant power devices has good response characteristic when the load changes suddenly.

It should be noted that the relation terms, for example, first, second, etc., are used herein merely for distinguishing one entity or operation from another entity or operation but do not necessarily require or imply that there exists any actual relation or sequence between these entities or operations. Furthermore, terms "comprising", "including" or any other variants thereof are intended to cover the non-exclusive including, thereby making that the process, method, object or apparatus comprising a series of elements comprise not only those elements but also other elements that are not listed explicitly or the inherent elements to the process, method, merchandise or apparatus. In the case of no more limitations, the element limited by the sentence "comprising a . . . " does not exclude that there exists another same element in the process, method, merchandise or apparatus comprising the element.

What is claimed is:

1. A generator system based on a high-frequency isolated matrix converter, comprising:
   a permanent magnet synchronous generator;
   a high-frequency matrix converter, wherein an output port of the permanent magnet synchronous generator is connected to a three-phase input of the high-frequency matrix converter;
   a center-tapped high-frequency transformer, wherein positive and negative output poles of the high-frequency matrix converter are connected to the primary side of the center-tapped high-frequency transformer, and a middle pole of the high-frequency matrix converter is connected to a center tap of the primary side of the center-tapped high-frequency transformer; and
   a full-bridge converter, wherein a midpoint of an input bridge arm of the full-bridge converter is connected to a secondary side of the center-tapped high-frequency transformer, and an output side of the full-bridge converter is connected with a DC load;
   wherein an action sequence of voltage vectors of the high-frequency matrix converter is determined according to a line current amplitude of a motor.

2. The generator system based on the high-frequency isolated matrix converter according to claim 1, wherein the high-frequency matrix converter comprises a first power switch, a second positive power switch, a second negative power switch, a third power switch, a fourth positive power switch, a fourth negative power switch, a fifth power switch, a sixth positive power switch and a sixth negative power switch;
   a common drain of the fourth positive power switch and the fourth negative power switch is connected to form a first bridge arm, the midpoint of which is connected to the source electrode of the first power switch and an a-phase port of the motor, respectively;
   a common drain of the sixth positive power switch and the sixth negative power switch is connected to form a second bridge arm, the midpoint of which is connected to the source electrode of the third power switch and a b-phase port of the motor, respectively;
   a common drain of the second positive power switch and the second negative power switch is connected to form a third bridge arm, the midpoint of which is connected to the source electrode of the fifth power switch and a c-phase port of the motor, respectively;
   a common drain of the first power switch, the third power switch and the fifth power switch are connected to form a first connection point, which is the output midpoint of the high-frequency matrix converter and is connected to the center tap of the center-tapped high-frequency transformer;
   a common source of the fourth positive power switch, the sixth positive power switch and the second positive power switch is connected to form a second connection point, which is connected to the source electrode of positive power switches, and the drain output of the positive power switches is connected to the non-corresponding terminal of the primary side of the center-tapped high-frequency transformer;
   a common source of the fourth negative power switch, the sixth negative power switch and the second negative power switch is connected to form a third connection point, which is connected to the source electrode of negative power switches, and the drain output of the negative power switches is connected to the corresponding terminal of the primary side of the center-tapped high-frequency transformer.

3. The generator system based on the high-frequency isolated matrix converter according to claim 2, wherein the full-bridge converter comprises a seventh power switch, an eighth power switch, a ninth power switch and a tenth power switch;
   the seventh power switch and the eighth power switch are connected in series to form a fourth bridge arm, and the ninth power switch and the tenth power switch are connected in series to form a fifth bridge arm.

4. The generator system based on the high-frequency isolated matrix converter according to claim 1, wherein an action time of three voltage vectors of the high-frequency matrix converter is corrected according to a commutation time of a leakage inductance current of the center-tapped high-frequency transformer, and the action time of the three voltage vectors of the high-frequency matrix converter after correction is:

$$\begin{cases} T_1 = T_s m_a \sin\left(\frac{\pi}{3} - \theta_i\right) \\ T_2 = T_s m_a \sin(\theta_i) + 2T_{d2} \\ T_0 = (T_s - T_1 - T_2) \end{cases}$$

wherein $T_1$, $T_2$ and $T_0$ are a sum of action time of a first active vector V1, a second active vector V2, and zero vectors V7 and V8, respectively; $m_a$ and $\theta_i$ are a modulation ratio and an angle of space vector modulation, respectively, and $T_s$ is one switching cycle.

5. The generator system based on the high-frequency isolated matrix converter according to claim 4, wherein the commutation time of the leakage inductance current of the center-tapped high-frequency transformer is $T_{d2}=|i_b|L_{kp}n_s/u_{dc}n_p$, wherein $u_{dc}$ is the DC load voltage of the full-bridge converter, $L_{kp}$ is the leakage inductance of the center-tapped high-frequency transformer, $n_p/n_s$ is the turn ratio of the center-tapped high-frequency transformer, and $i_b$ is the b-phase winding current of the motor.

6. The generator system based on the high-frequency isolated matrix converter according to claim 5, wherein the high-frequency matrix converter is suitable for other isolated AC-DC conversion applications with AC power supply.

7. The generator system based on the high-frequency isolated matrix converter according to claim 1, wherein the high-frequency matrix converter adopts a field-oriented control scheme, and realizes high-efficiency operation of the system through dual-closed-loop control of D-axis and Q-axis currents.

8. A regulation method for a generator system based on a high-frequency isolated matrix converter according to claim 1, comprising the following steps:

four voltage vectors acting on the high-frequency matrix converter in a positive half cycle of a power switch are the first zero vector of the positive half cycle $V_8$, the first active vector of the positive half cycle $V_1$, the second active vector of the positive half cycle $V_2$ and the second zero vector of the positive half cycle $V_7$; corresponding input currents of the high frequency matrix transformer are 0, I1, I2 and 0, respectively; after comparing inductance currents of the motor, it is determined that the action sequence of the four voltage vectors is $V_8$, $V_1$, $V_2$ and $V_7$, when $I_2>I_1>0$, and $I_1$ and $I_2$ are the a-phase current and the negative c-phase current $i_a$ and $-i_c$, respectively, wherein at an action stage of the second zero vector of the negative half cycle, the second zero vector of the negative half cycle $V_8$ acted on the high-frequency matrix converter during the previous switching cycle, but after one switching cycle begins, the second negative power switch, the fourth negative power switch and the sixth negative power switch of the high-frequency matrix converter are turned on, and the negative power switches have an "ON" signal; besides, the eighth power switch and the ninth power switch of the full-bridge converter have an "ON" signal;

at an action stage of the first zero vector of the positive half cycle, the first zero vector of the positive half cycle $V_8$ firstly acts on the high-frequency matrix converter after one switching cycle starts, the second negative power switch, the fourth negative power switch and the sixth negative power switch are turned off with zero current, and the second positive power switch, the fourth positive power switch and the sixth positive power switch are turned on with zero voltage; the state of the full-bridge converter remains unchanged, and the converter does not transmit energy at the moment;

at a commutation stage of the leakage inductance current, the first active vector of the positive half cycle $V_1$ is ready to act after the action time of the first active vector of the positive half cycle $V_8$ is over: first, the leakage inductance current of the transformer is increased to prevent voltage spikes caused by unequal phase currents with inductance; then, the positive power switches are turned on, the negative voltage is loaded on the leakage inductance of the transformer, which increases the current of the leakage inductance until that equals to the current corresponding to the first active vector of the next positive half cycle; at the moment, body diodes of the first power switch, the third power switch and the fifth power switch are freewheeling, and the eighth power switch and the ninth power switch of the full-bridge converter are turned on;

at an action stage of the first active vector of the positive half cycle, the first zero vector of the positive half cycle $V_1$ begins to act on the high-frequency matrix converter after the commutation stage of the leakage inductance current is over, the first power switch is turned on with zero voltage, the driving signals of the eighth power switch and the ninth power switch of the full-bridge converter are removed, the current of the transformer is commutated to the anti-parallel diodes of the seventh power switch and the tenth power switch, the seventh power switch and the tenth power switch are turned on with zero voltage, and the energy is transmitted to the DC load from the motor side at the moment;

at an action stage of the second active vector of the positive half cycle, the second active vector of the positive half cycle $V_2$ starts to act after the action time of the first active vector of the positive half cycle $V_1$ is over, the leakage inductance current the transformer is naturally commutated, and the energy is transmitted from to the DC load from the motor side at the moment;

after an action time of the second active vector of the positive half cycle $V_2$ is over, the second zero vector of the positive half cycle starts to act, the second positive power switch is then turned off, the fifth power switch is turned on, and the winding current of the motor are freewheeling in the first power switch, the third power switch and the fifth power switch; the positive power switches of the high-frequency matrix converter, the seventh power switch and tenth power switch of the full-bridge converter are turned off without current path; and the converter does not transmit any energy at the moment.

\* \* \* \* \*